May 25, 1954  F. E. SCHULTE  2,679,186

MOVIE CAMERA SHUTTER RELEASE ACTUATING MEANS

Filed Aug. 1, 1952

INVENTOR:
FREDERICK E. SCHULTE
BY John L. Diehl
ATTORNEY

Patented May 25, 1954

2,679,186

UNITED STATES PATENT OFFICE 2,679,186

MOVIE CAMERA SHUTTER RELEASE ACTUATING MEANS

Frederick E. Schulte, Cedar Rapids, Iowa, assignor to Bjorksten Research Laboratories, Inc., a corporation of Illinois Application August 1, 1952, Serial No. 302,215

5 Claims. (Cl. 88—16)

This invention relates to electromechanical means for actuating the shutter release mechanism of a camera particularly a movie camera.

For many purposes it is desired to record various forms of intelligence on a continuous photographic film by a series of single frame exposures. For example, it is becoming a common practice to record reports, correspondence, laboratory notes, and the like upon photographic film for the purpose of providing a permanent record which may be stored in a relatively small space as by the microfilming and bibliofilm techniques. In laboratory and experimental work it is in many cases desired to record various data, operations and other forms of intelligence; such as wave patterns on an oscilloscope, by a series of photographs.

The ordinary types of cameras are not readily adaptable for this type of photography because of the limitations with respect to the length of film which such cameras will accept and the relatively time consuming and cumbersome method of advancing the film after each exposure. Movie type cameras are ideally suited for such purposes because means are incorporated in the operating mechanism to advance the film after each individual exposure. However, the normal movie type cameras do not have an exposure mechanism for readily exposing a single frame by a manual operation of the shutter release. Movie type cameras and specially designed cameras may be obtained with such single-frame exposure release mechanism, however, these types of cameras are quite costly.

One of the principal purposes of the present invention is to provide means whereby the conventional relatively inexpensive movie type cameras may be used for single-frame type photography.

Another of the purposes of this invention is to provide electromechanical means adaptable for use with various movie type cameras so as to actuate the shutter release mechanism to expose a single photographic frame.

A further purpose of this invention is to provide an electromechanical shutter release means which is adaptable for studio or portable use.

Other objects and advantages of my invention will become apparent from the description and claims which follow.

Figure 1:
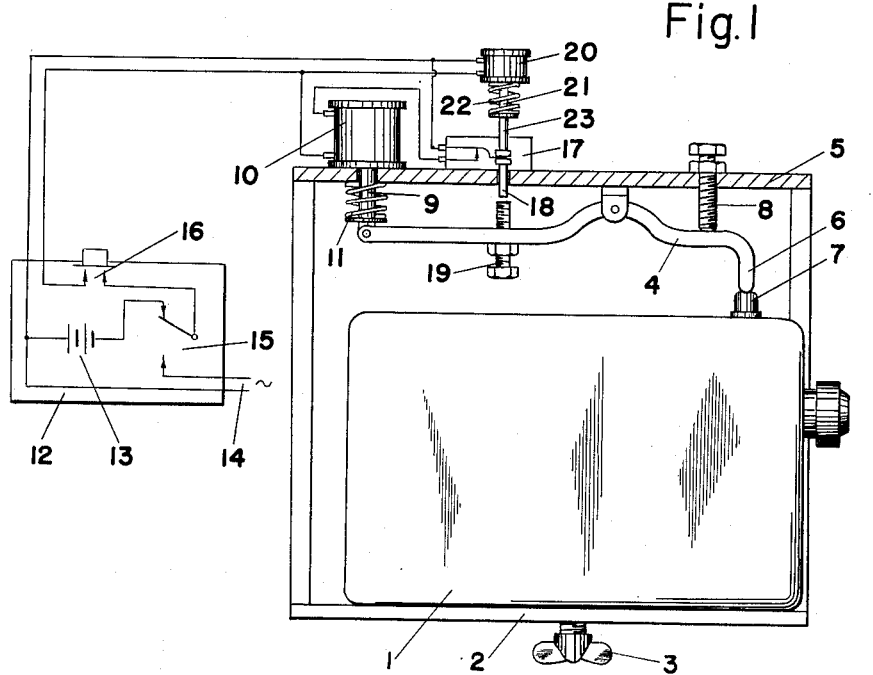
Fig. 1 is a side elevational view, partly diagrammatically of the electromechanical operating means of my invention.

The camera 1 is secured to the base 2 of a supporting frame by suitable means such as a threaded stud 3 in operative relationship with the actuating means. A rocker arm 4 is pivotally supported from the upper wall 5 of the supporting frame. One end of the rocker arm 4 extends downwardly as at 6 and is adapted to contact the external shutter release 7 of the camera. The upward movement of this end of the rocker arm is limited by the threaded stud 8 so as to limit the lost motion of the rocker arm.

The opposite end of the rocker arm 4 is pivotally secured to the armature 9 of the solenoid 10. A coil spring 11 encompassing the armature and positioned between wall 5 and the rocker arm constantly urges the armature into extended position. The threaded stud 8 limits the counter-clockwise motion of the rocker arm. Upon energization of the solenoid 10, the armature 9 is retracted thereby causing a clockwise pivoting of the rocker arm and a depression of the external shutter release 7 so as to permit the shutter mechanism of the camera to expose the film in the camera.

The electrical energy supply for energization of the solenoid may consist of a battery 13 housed in a remote control box 12. The control box also may be provided with a cable 14 adapted to be connected to a source of alternating power. By providing a self contained battery, the unit is adapted for portable use as well as studio use. A single pole double throw selector switch 15 is provided to permit selection of the desired power source. Push button switch 16 is provided to connect the operating mechanism with the power source.

A normally closed reset type switch 17 is included in series with the push button switch 16 and solenoid 10. The reset type switch is mounted on the upper wall 5 of the frame. The plunger 18 adapted to open the reset switch projects through an aperture in the wall 5 and is positioned to be engaged by an adjustable screw 19 secured to the rocker arm. A second solenoid 20 having an armature 21 is positioned above the reset type switch, the armature being constantly urged in extended position by spring 22. The reset plunger 23 of the reset type switch is secured to the armature 21 and in normal position the reset switch is maintained in closed position. The solenoid 20 is connected to the power source through the push button switch 16 and is in parallel with the solenoid 10 and the reset type switch 17.

In use of the mechanism, selector switch 15 is adjusted for the desired power source. Upon closing of the circuit by operation of push button 16, the source voltage is impressed across solenoid 20 and across solenoid 10 through reset type switch 17. Armature 21 is thereby retracted, withdrawing the reset plunger 23 of the reset type switch 17 without opening the switch. Armature 9 of solenoid 10 is also retracted thereby moving the rocker arm 4 in a clockwise direction. Such motion of the depending portion 6 of the rocker arm depresses the external shutter release 7 so as to permit the shutter mechanism of the camera to expose the film by the normal process of movie camera framing.

Since it is desired to limit the operation of the shutter mechanism, it is necessary to limit the period during which the rocker arm maintains the external shutter release 7 in depressed position. This limit is obtained by adjustment of the screw 19 so as to cause the end of the screw to contact plunger 18 of the reset type switch 17 at approximately the same instant that the shutter mechanism is released. Upward pressure on plunger 18 of the reset type switch causes an opening of the switch thereby opening the circuit to solenoid 10 and deenergizing this solenoid. Upon deenergization of the solenoid 10, coil spring 9 withdraws the armature and causes the rocker arm 4 to pivot in a counterclockwise direction thereby releasing the pressure on the external shutter release 7 of the camera and arresting the action of the shutter mechanism. Thus the shutter mechanism may be limited to a single framing operation.

The solenoid 20 will remain energized and the reset type switch 17 will remain open until the push button 16 is released thereby preventing further operation of the shutter mechanism. Upon release of the push button switch 16, the circuit to the solenoid 20 is opened allowing the coil spring 22 to withdraw armature 21 thereby lowering the plunger 23 of the reset type switch to again close the switch. The mechanism is then in condition for subsequent operation.

Figure 2:
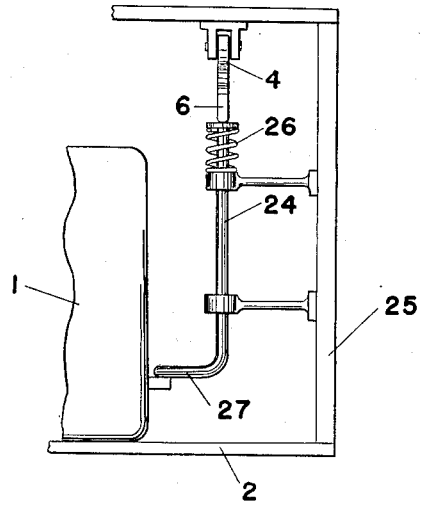
Fig. 2 is a front elevational view of a modification of a portion of the operating means.

Modifications of the apparatus obviously may be made without departing from my invention. For example, some inexpensive cameras are provided with an external shutter release positioned adjacent the bottom of the camera. As illustrated in Fig. 2, the device may be provided with a vertical push rod 24 which is slidably supported from a vertical member 25 of the frame. A coil spring 26 may be provided so as to counterbalance the push rod and maintain the upper end of the push rod in contact with the depending end 6 of the rocker arm 4. The lower end of the push rod may be turned inwardly as at 27 so as to provide means for contacting the external shutter release of the camera.

I claim:

1. A movie camera shutter release actuating mechanism comprising a supporting frame having a top wall and adapted to receive a movie camera having an external shutter release, a rocker arm pivotally supported from the top wall, a solenoid mounted on the top wall and having an armature pivotally secured to one end of the rocker arm, the other end of the rocker arm being adapted to actuate the shutter release, a normally closed reset type switch mounted on the top wall, a first operating plunger adapted to open said switch and positioned in proximity to the rocker arm whereby said switch is opened upon pivotal motion of the rocker arm, a second operating plunger adapted to close said switch, a second solenoid having an armature connected to the second plunger, the reset type switch and the first solenoid being connected in series and being connected in parallel with the second solenoid and means for impressing electrical energy across the parallel circuits.

2. A movie camera shutter release actuating mechanism comprising a supporting frame having a top wall and adapted to receive a movie camera having an external shutter release, a rocker arm pivotally supported from the top wall, a solenoid mounted on the top wall and having an armature extending through the top wall and pivotally secured to one end of the rocker arm, means for urging the armature in extended position, the other end of the rocker arm being adapted to actuate the shutter release, a normally closed reset type switch mounted on the top wall and having a first operating plunger adapted to open the switch and extending through the top wall at a point intermediate the pivotal support for the rocker arm and the first end of the rocker arm, a second operating plunger adapted to close the switch, a second solenoid having an armature connected to the second plunger, means for urging the armature in extended position, the first solenoid and the reset type switch being connected in series and being connected in parallel with the second solenoid and means for impressing electrical energy across said parallel circuit.

3. A movie camera shutter release actuating mechanism comprising a supporting frame adapted to receive a movie camera having an external shutter release, means mounted on the frame for actuating the shutter release, a solenoid mounted on the frame and having an armature pivotally secured to one end of the actuating means, means for urging the armature in extended position, the other end of the actuating means being adapted to actuate the shutter release, a normally closed reset-type switch mounted on the frame, a first operating plunger adapted to open said switch and positioned in proximity to the actuating means whereby said switch is opened upon pivotal motion of the actuating means, a second operating plunger adapted to close said switch, a second solenoid having an armature connected to the second plunger, the reset-type switch and the first solenoid being connected in series and being connected in parallel with the second solenoid and means for impressing electrical energy across the parallel circuits.

4. A movie camera shutter release actuating mechanism comprising a supporting frame having a top wall adapted to receive a movie camera having an external shutter release, means mounted on the frame for actuating the shutter release supported from the top wall, a solenoid mounted on the top wall and having an armature pivotally secured to one end of the actuating means, the other end of the actuating means being adapted to actuate the shutter release, a normally closed reset-type switch mounted on the top wall, a first operating plunger adapted to open said switch and positioned in proximity to the actuating means whereby said switch is opened upon pivotal motion of the actuating means, a second operating plunger adapted to close said switch, a second solenoid having an armature connected to the second plunger, the reset-type switch and first solenoid being connected in series and being connected in parallel with the second solenoid and means for impressing electrical energy across the parallel circuits.

5. A movie camera shutter release actuating mechanism comprising a supporting frame having a top wall and adapted to receive a movie camera having an external shutter release, means mounted on the frame for actuating the shutter release, a solenoid mounted on the top wall and having an armature extending through the top wall, and pivotally secured to one end of the actuating means, means for urging the armature in extended position, the other end of the actuating means being adapted to actuate the shutter release, a normally closed reset type switch mounted on the top wall and having a first operating plunger adapted to open the switch and extending through the top wall at a point intermediate the pivotal support for the actuating means and the first end of the actuating means, a second operating plunger adapted to close the switch, a second solenoid having an armature connected to the second plunger, means for urging the armature in extended position, the first solenoid and the reset type switch being connected in series and being connected in parallel with the second solenoid and means for impressing electrical energy across said parallel circuit.

References Cited in the file of this patent

UNITED STATES PATENTS

| Number | Name | Date |
| --- | --- | --- |
| 1,999,278 | Britten | Apr. 30, 1935 |
| 2,160,390 | Pfannenstiehl | May 30, 1939 |

FOREIGN PATENTS

| Number | Country | Date |
| --- | --- | --- |
| 145,202 | Great Britain | July 2, 1920 |